United States Patent
Tsirkin et al.

(10) Patent No.: US 9,712,436 B2
(45) Date of Patent: Jul. 18, 2017

(54) ADAPTIVE LOAD BALANCING FOR BRIDGED SYSTEMS

(71) Applicant: Red Hat Israel, Ltd., Ra'anana (IL)

(72) Inventors: Michael S. Tsirkin, Ra'anana (IL); Veaceslav Falico, Brno (CZ)

(73) Assignee: RED HAT ISRAEL, LTD., Ra'anana (IL)

(*) Notice: Subject to any disclaimer, the term of this patent is extended or adjusted under 35 U.S.C. 154(b) by 210 days.

(21) Appl. No.: 14/323,797

(22) Filed: Jul. 3, 2014

(65) Prior Publication Data

US 2016/0006687 A1    Jan. 7, 2016

(51) Int. Cl.
*H04L 12/721* (2013.01)
*H04L 29/08* (2006.01)
*G06F 9/455* (2006.01)
*G06F 9/50* (2006.01)
*H04L 29/12* (2006.01)

(52) U.S. Cl.
CPC .......... *H04L 45/66* (2013.01); *G06F 9/45558* (2013.01); *G06F 9/505* (2013.01); *H04L 67/1002* (2013.01); *H04L 69/324* (2013.01); *G06F 2009/45595* (2013.01); *H04L 61/2596* (2013.01); *H04L 61/6022* (2013.01)

(58) Field of Classification Search
CPC .............. H04L 67/1008; H04L 67/1002; H04L 61/2517; H04L 41/0803; H04L 41/0806; H04L 41/0893; H04L 61/2503
See application file for complete search history.

(56) References Cited

U.S. PATENT DOCUMENTS

| 7,478,173 | B1 | 1/2009 | Delco |
| 7,505,401 | B2 | 3/2009 | Kashyap |
| 7,796,506 | B2 | 9/2010 | De Heer et al. |
| 7,899,848 | B2 | 3/2011 | Yin et al. |
| 7,934,020 | B1 | 4/2011 | Xu et al. |
| 8,582,579 | B2 | 11/2013 | Yousefi et al. |
| 2004/0158651 | A1 | 8/2004 | Fan et al. |

(Continued)

OTHER PUBLICATIONS

Gai, Silvano, "FCoE: Addressing", Nuova Systems, T11/07-547v1, ftp://147.145.44.154/t11/document.07/07-547v1.pdf, Nov. 2007, 28 pgs.

(Continued)

*Primary Examiner* — Charles C Jiang
*Assistant Examiner* — Oussama Roudani
(74) *Attorney, Agent, or Firm* — Haynes and Boone, LLP

(57) ABSTRACT

Methods, systems, and computer program products for providing adaptive load balancing for bridged systems are disclosed. Examples generally relate to both physical and virtualized computer systems. A computer-implemented method may include mapping a first network interface to each of a plurality of intermediate network interfaces, determining a second network interface to use from the intermediate network interfaces for sending an outbound packet received from the first network interface, updating the outbound packet by replacing a source layer-2 network address of the outbound packet with a layer-2 network address assigned to a mapping between the first network interface and the second network interface, and sending the updated outbound packet using the second network interface.

20 Claims, 5 Drawing Sheets

(56) References Cited

U.S. PATENT DOCUMENTS

| | | | | |
|---|---|---|---|---|
| 2011/0299537 A1* | 12/2011 | Saraiya | ............... | H04L 61/2596 |
| | | | | 370/392 |
| 2013/0058229 A1* | 3/2013 | Casado | ................ | H04L 45/745 |
| | | | | 370/252 |
| 2014/0185623 A1* | 7/2014 | Yam | ...................... | H04L 47/765 |
| | | | | 370/401 |

OTHER PUBLICATIONS

Xie, Xia et al, "I/O Scheduling by Using Multi-Network Interfaces of Virtualization System", published in: Trust, Security and Privacy in Computing and Communications (TrustCom), 2011 IEEE 10$^{th}$ International Conference on Nov. 2011, pp. 1347-1354.

Xiaojing, Wang et al, "Evaluation on Network Loading Balancing in Xen", published in: Consumer Electronics, Communications and Networks (CECNet), 2012 2$^{nd}$ International Conference on Apr. 2012, pp. 3235-3238.

* cited by examiner

ADAPTIVE LOAD BALANCING FOR BRIDGED SYSTEMS

TECHNICAL FIELD

Examples of the present disclosure generally relate to communication between computing systems and networks, and more specifically, relate to providing adaptive load balancing for bridged systems.

BACKGROUND

Link aggregation generally refers to various methods of combining multiple network connections together for faster performance and increased stability through redundancy. Channel bonding is a form of link aggregation that allows two or more network interfaces to be combined into a single logical connection. A channel bonding driver may be included with an operating system to allow network interface aggregation without special hardware support.

Network bridging generally refers to the creation of an aggregate network from two or more different networks or network segments. While several channel bonding modes exist, channel bonding generally does not distribute network traffic evenly across multiple network interfaces in bridged systems, including virtual machines. Instead, packets from a source system usually are transmitted over the same network interface even though one or more other network interfaces are available as part of a bonded network interface. Thus, channel bonding may not effectively utilize each bonded network interface in a bridged system.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
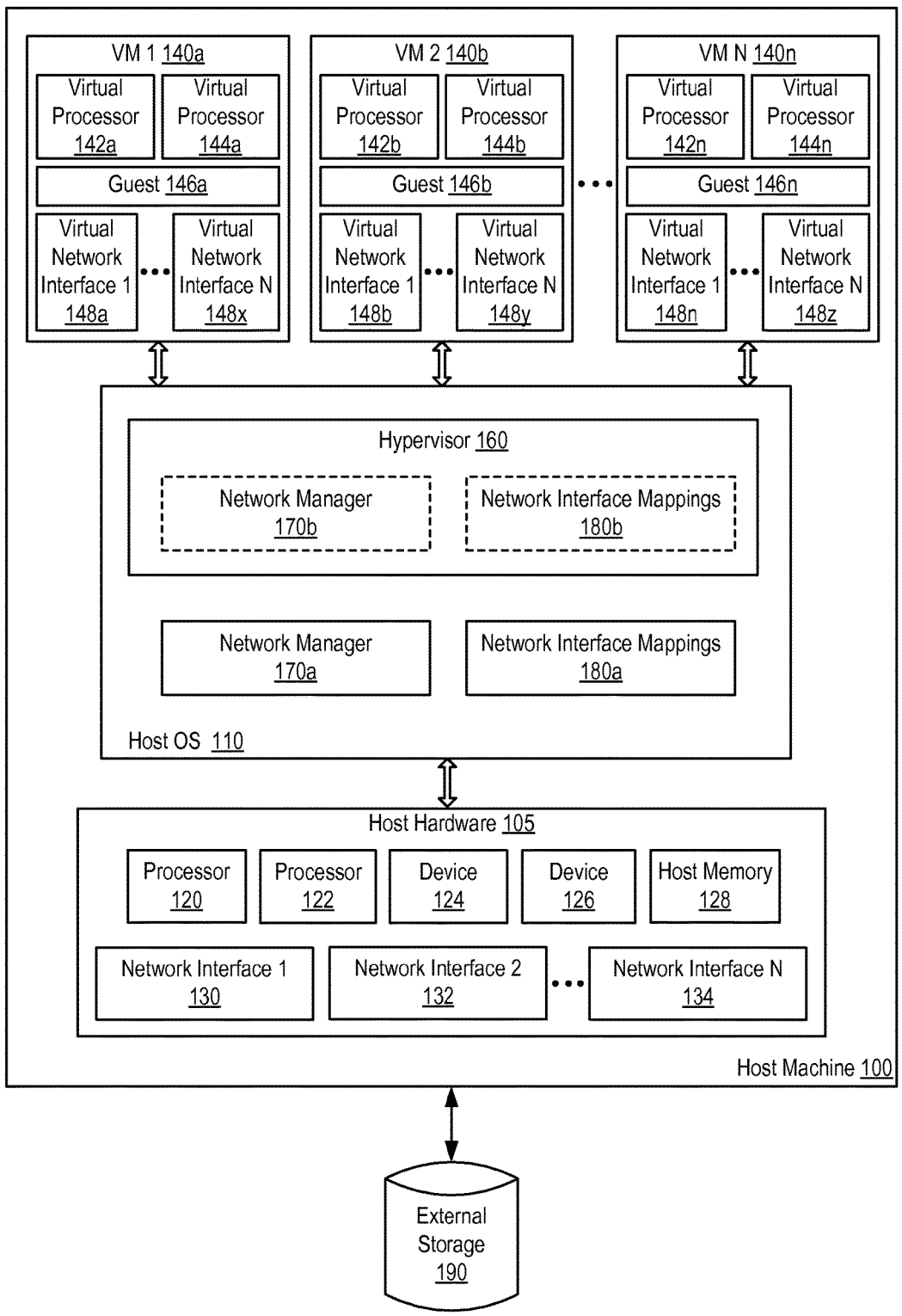
FIG. 1 is a block diagram illustrating an example of a computer system hosting one or more virtual machines.

Disclosed herein are systems, methods, and computer program products for providing adaptive load balancing for bridged systems.

In an example, a virtual network interface is mapped to each of at least two intermediate network interfaces by a network management module of an operating system. Each of the mappings includes an assigned virtualized layer-2 network address identifying an association between the mapped network interfaces.

The network management module receives an outbound packet from the virtual network interface and selects one of the intermediate network interfaces to use for distributing the outbound packet. For example, the network management module may select an intermediate network interface based on utilization of one or more intermediate network interfaces. The network management module locates the mapping between the virtual network interface and the selected intermediate network interface to obtain the virtualized layer-2 network address assigned to the mapping. The network module replaces the source layer-2 network address of the outbound packet with the virtualized layer-2 network address assigned to the mapping. The network module then forwards the updated outbound packet to the selected intermediate network interface, which sends the updated outbound packet out on a network.

The network management module also receives inbound network packets from each of the intermediate network interfaces. The network management module examines a layer-2 network address of each inbound packet it receives from each of the intermediate network interfaces. The network management module compares a destination layer-2 network address of an inbound packet to virtualized layer-2 network addresses assigned to network interface mappings to locate a virtual network interface to receive the inbound packet. The network management module replaces a destination layer-2 network address of the inbound packet with a layer-2 network address of the virtual network interface that is to receive the packet. The network management module then delivers the updated inbound packet to the virtual network interface. Accordingly, the network management module may dynamically and flexibly distribute network traffic across any of multiple network interfaces in a bridged system.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a physical computer system, referred to herein as a host machine 100 that hosts one or more virtual machines (VMs) (e.g., VM1 140a, VM2 140b and VM N 140n). Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, host memory 128, multiple network interfaces 130, 132, 134, and other hardware components. Host memory 128 may include volatile memory devices (e.g., random access memory (RAM)), non-volatile memory devices (e.g., flash memory), and/or other types of memory devices. Host hardware 105 also may be coupled to external storage 190 via a direct connection or a local network. Host machine 100 may be a single machine or multiple host machines arranged in a cluster.

In an example, each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

A "processing device" generally refers to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with host machine 100 (e.g., notify host machine 100 of events) by generating device interrupts.

Host machine 100 includes multiple network interfaces 130, 132, 134 that connect to host machine 100 to one or more networks. A network generally refers to any computer, telecommunications, or data path that allows the exchange of data between computer systems. Networks may include but are not limited to wired networks, wireless networks, public networks (e.g., the Internet), private networks (e.g., a local area network (LAN), a metropolitan area network (MAN), a wide area network (WAN)), fibre channel communication, or any combination thereof. Each network interface 130, 132, 134 allows host machine 100 to send and receive data via one or more networks.

Each network interface 130, 132, 134 may include one or more processors and one or more memory devices, which may be part of an application-specific integrated circuit (ASIC) of a network interface. The processors may perform operations on data within a respective network interface, for example, by preparing packets for transmission over a network, receiving packets from a network, etc. The memory devices may include read-only memory and/or random access memory for storing instructions to be executed, referenced, or otherwise used by the processors. Further, each network interface generally has a unique media access control (MAC) address identifier, which may be referred to as a layer-2 network address used in switching and in other networking processing.

Network interfaces 130, 132, 134 may operate independently or may be aggregated to provide increased throughput and redundancy for host machine 100. For example, two or more of network interfaces 130, 132, 134 may be bonded as a single logical network interface. Further, each bonded network interface may be utilized based on a mode of network interface bonding. For example, network traffic may be transmitted across bonded network interfaces in a round-robin mode. Bonded network interfaces also may be configured in an active-backup mode to provide fault tolerance.

Host machine 100 includes a hypervisor 160 (also known as a virtual machine monitor (VMM)). In one example (as shown), hypervisor 160 is a component of a host operating system 110. Alternatively, hypervisor 160 may run on top of a host OS 110, or may run directly on host hardware 105 without the use of a host OS 110.

Hypervisor 160 manages system resources, including access to host memory 128, devices 124, 126, network interfaces 130, 132, 134, secondary storage, and so on. Hypervisor 160, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 160 presents to other software (i.e., "guest" software) the abstraction of one or more virtual machines (VMs) (e.g., VM 1 140a, VM 2 140b, VM N 140n), which may provide the same or different abstractions to various guest software (e.g., guest operating system, guest applications).

Host machine 100 hosts any number of virtual machines (VMs) (e.g., a single VM, one hundred VMs, etc.). A virtual machine (e.g., VM 1 140a, VM 2 140b, VM N 140n) is a combination of guest software that uses an underlying emulation of host machine 100 (e.g., as provided by hypervisor 160). Guest software (e.g., guest 146a, 146b, 146n) may include a guest operating system, guest applications, guest memory, guest device drivers, etc. Virtual machines 140a, 140b, 140n can be, for example, hardware emulation, full virtualization, para-virtualization, and operating system-level virtualization virtual machines. Virtual machines 140a, 140b, 140n may have the same or different guest operating systems, such as Linux®, Solaris®, Microsoft® Windows®, etc.

Guest memory generally describes memory allocated to and available for use by a guest 146a, 146b, 146n. In an example, guest memory may be memory presented to a guest OS by hypervisor 160. In one example, guest memory is mapped to and provided using corresponding memory from a host machine 100 (e.g., host memory 128). For example, a page (or other unit) of guest memory 158 may be mapped to and provided using a corresponding page (or other unit) of host memory 128.

Each virtual machine 146a, 146b, 146n may include multiple virtual processors (e.g., virtual processors 142a and 144a, 142b and 144b, 142n and 144n). Each virtual processor of a respective virtual machine executes on a specific processor 120, 122 of host machine 100. Hypervisor 160 may control which virtual processors run on which hardware processors 120, 122. For example, one virtual processor may run on a physical processor 120, and a second virtual processor may run on a different physical processor 122 (or vice versa).

Each virtual machine (VM 1 140a, VM2 140b . . . VM N 140n) may include multiple virtual network interfaces (e.g., virtual network interface 1 148a . . . virtual network interface N 148x, virtual interface 1 148b . . . virtual network interface N 148y, virtual network interface 148n . . . virtual network interface N 148z). A virtual network interface generally describes an emulation of a physical networking interface provided for a virtual machine. Each network interface (e.g., network interface 1 130 . . . network interface N 134) can be used to provide underlying functionality for multiple virtual network interfaces. In an example, each virtual machine includes one or more virtual network interfaces that each have a unique media access control (MAC) address on the host where a virtual machine runs.

Host OS 110 includes a network manager 170a and network interface mappings 180a. In an example, hypervisor 160 also or alternatively may include a network manager 170b and network interface mappings 180b.

In an example, network manager 170a, 170b manages interaction between virtual network interfaces (e.g., virtual network interface 1 148a) and physical network interfaces (e.g., network interface 1 130). In one example, network manager 170a, 170b creates network interface mappings 180a, 180b between network interfaces, such as between a virtual and a physical network interface. Network manager 170a, 170b also may generate and assign a virtualized media access control (MAC) address to each mapping to uniquely represent the association and network packets processed using a combination of the associated network interfaces. In an example, virtualized MAC address generally is a MAC address created for a purpose other than to specifically identify a hardware component or emulated hardware component.

Network interface mappings 180a, 180b generally refer to one or more data records that indicate an association between at least two different network interfaces. Network interface mappings 180a, 180b may be stored in memory or on any other computer readable medium. Network interface mappings 180a, 180b, for example, may be stored together in a single table or other data structure. Network interface mappings 180a, 180b also may be distributed. For example, network interface mappings 180a, 180b may be organized as a set of tables that each correspond to a network interface. In one example, a separate table is used to store network interface mappings 180a, 180b for each network interface (e.g., network interface 1 . . . network interface N 134) of host machine 100.

In an example, network manager 170a, 170b receives and processes inbound and outbound network packets. For example, network manager 170a, 170b may receive an outbound network packet from a virtual interface, which is to be sent using a physical network interface. Network manager 170a, 170b also may receive an inbound network packet from a physical network interface that is to be delivered to a virtual network interface of a virtual machine.

In an example, network manager 170a, 170b adaptively balances packet processing across multiple network interfaces of a bridged system. For example, network manager 170a, 170b may select a network interface to use based on utilization of one or more available network interfaces.

In an example, network manager 170a, 170b also examines network packets, updates network packets, and forwards network packets to appropriate physical and virtual network interfaces. In one example, network manager 170a, 170b includes a network interface bonding module to allow network manager 170a, 170b to aggregate two or more network interfaces into a single logical network interface.

In general, examples presented in this disclosure with respect to physical computer systems also may be applied using virtualized computer systems (and vice versa). Further, examples presented in the context of physical computer systems or virtualized computer systems are not intended to be limiting and similarly may be applied in other contexts.

Figure 2:
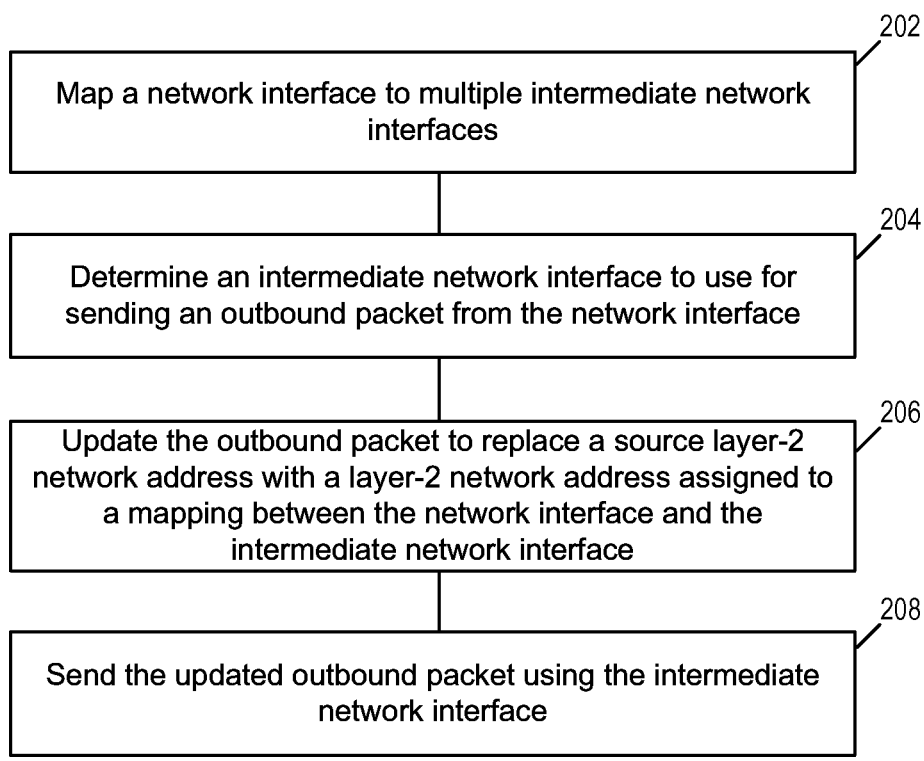
FIG. 2 is a flow diagram illustrating an example of a method for performing adaptive load balancing of outbound packets in a bridged system.

FIG. 2 is a flow diagram illustrating an example of a method for performing adaptive load balancing of outbound packets in a bridged system. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 200 is performed by network manager 170a of host OS 110. In one example, the method 200 is performed by network manager 170b of hypervisor 160. Examples are discussed in the context of network manager 170a of host OS 110 for the purpose of consistency. However, such examples are applicable to both physical computer systems and virtualized computer systems.

Method 200 begins at block 202 when network manager 170a maps a network interface to multiple intermediate network interfaces. In an example, network manager 170a maps a virtual network interface (e.g., virtual network interface 1 148a) of a virtual machine (e.g., VM1 140a) to multiple physical network interfaces (e.g., network interface 1 130, network interface 2 132 . . . network interface N 134). In one example, network manager 170a maps one or more virtual network interfaces (e.g., virtual network interface 1 148a . . . virtual network interface N 1 148x) of a virtual machine (e.g., virtual network interface 1 148a) to each of a plurality of physical network interfaces (e.g., network interface 1 130, network interface 2 132 . . . network interface N 134). Network manager 170a also may map each of one or more virtual network interfaces (e.g., virtual network interface 1 148a . . . virtual network interface N 148x, virtual network interface 2 148b . . . virtual network interface N 148y, virtual network interface 1 148n . . . virtual network interface N 148z) of respective virtual machines (e.g., VM 1 140a, the VM2 140b . . . VM N 140n) to each of a plurality of physical network interfaces (e.g., network interface 1 130, network interface 2 132 . . . network interface N 134).

In an example, a mapping is an association between different network interfaces, which is represented by data. In one example, a mapping between a network interface and an intermediate network interface comprises and an identifier of the network interface and an identifier of the intermediate network interface to create an association between the mapped network interfaces. A mapping also may include additional information or a link to other information that relates to or describes the association between network interfaces.

In an example, network manager 170a maintains a set of network interface mappings 180a. In one example, a mapping between a network interface and an intermediate network interface includes a distinct, virtualized MAC address assigned to each respective mapping. For example, network manager 170a may assign a designated or random virtualized MAC address to each mapping to uniquely identify packets from a first network interface that are distributed by an intermediate network interface. Network manager 170a also may direct inbound packets marked with a virtualized MAC address based on a corresponding mapping. In one example, network manager 170a assigns a distinct virtualized MAC address to each network interface mapping to provide adaptive load balancing across multiple network interfaces in a bridged system and to spread network traffic more evenly across an entire network.

At block 204, network manager 170a determines an intermediate network interface to use for sending an outbound packet from the network interface. In an example, network manager 170a receives an outbound packet from a virtual network interface (e.g., virtual network interface 1 148a) of a virtual machine (e.g., VM 1 140a). Network manager 170a determines an intermediate network interface (e.g., network interface 1 130) to use among various intermediate network interfaces (e.g., network interface 1 130 . . . network interface N 134) for sending the outbound packet. For example, network manager 170a may determine the intermediate network interface to use either prior to or after the outbound packet has been received.

At block 206, network manager 170a updates the outbound packet to replace a source layer-2 network address with a layer-2 network address assigned to a mapping between the network interface and the intermediate network interface. In an example, network manager 170a examines a mapping between a virtual network interface (e.g., virtual network interface 1 148a) and an intermediate network interface (e.g. network interface 1 130) that has been selected to send an outbound packet on behalf of the virtual network interface. In one example, network manager 170a searches network interface mappings 180a to locate a corresponding mapping between the network interfaces and to determine whether a virtualized MAC address has been assigned to the mapping.

In an example, network manager 170a updates the outbound packet received from the virtual network interface (e.g., virtual network interface 1 148a) by replacing the source MAC address of the outbound packet with the virtualized MAC address assigned to the mapping between the virtual network interface (e.g., virtual network interface 1 148a) and the intermediate network interface (e.g. network interface 1 130) selected to distribute the outbound packet. In an example, each additional outbound packet received from the same virtual network interface (e.g., virtual network interface 1 148a) that is to be distributed via the same intermediate network interface (e.g. network interface 1 130) also is similarly updated with the virtualized MAC address assigned to the mapping. Further, other outbound packets received from a different virtual network interface (e.g., virtual network interface 1 148b) or that are to be distributed via a different intermediate network interface (e.g. network interface 2 132) are updated with a different virtualized MAC address assigned to a different, corresponding network interface mapping.

In an example, network manager 170a forwards the original outbound packet to the selected intermediate network interface for distribution without update when a corresponding network interface mapping does not exist or is not found. In one example, network manager 170a also may forward the original outbound packet to the selected intermediate network interface without updating the outbound packet when a virtualized network address is not associated with a corresponding mapping.

At block 208, network manager 170a sends the updated outbound packet using the intermediate network interface. In an example, network manager 170a forwards the updated outbound packet to the intermediate network interface selected to send the packet. The intermediate network interface then sends the updated outbound packet over a network.

Figure 3:
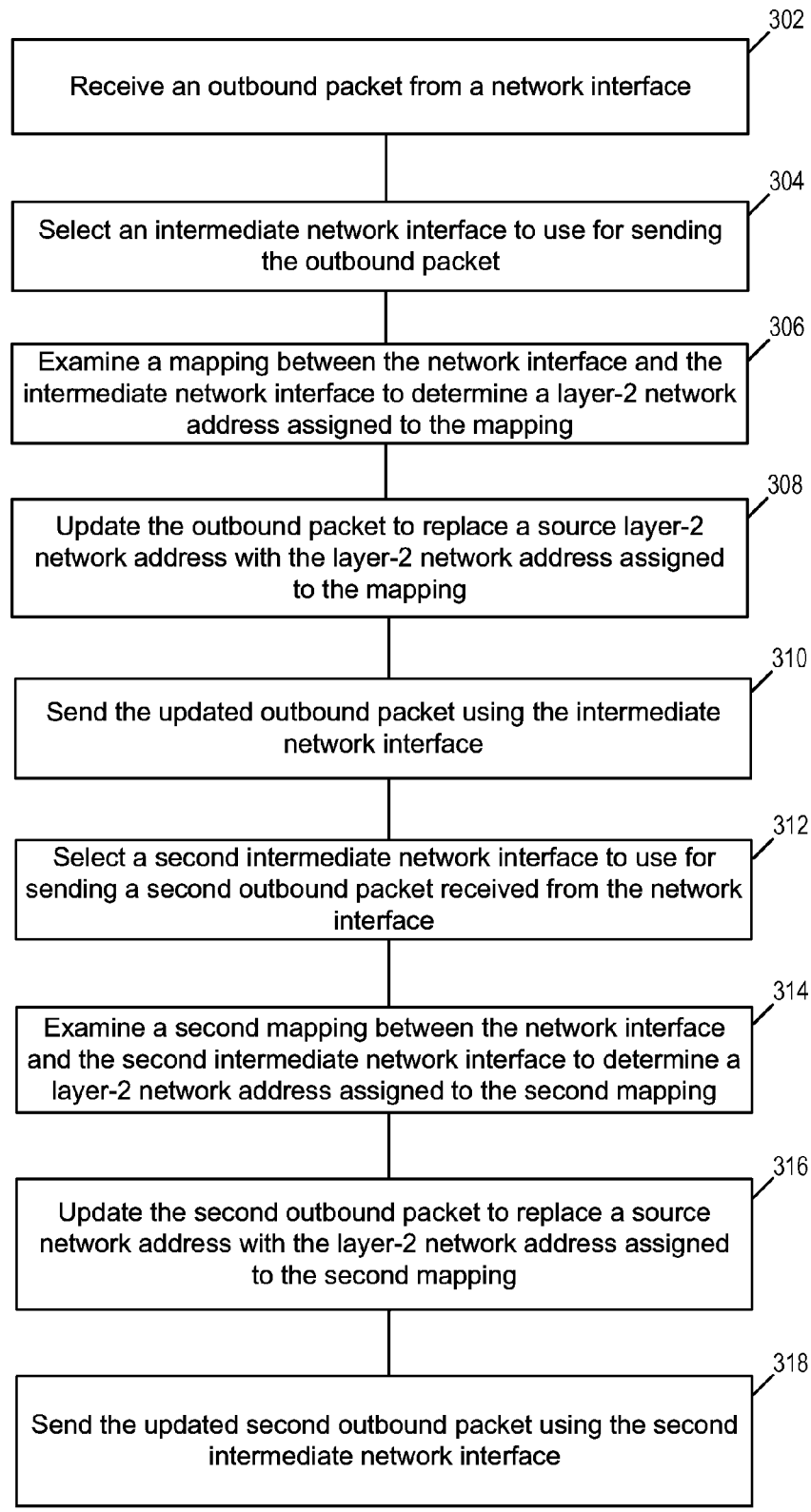
FIG. 3 is a flow diagram illustrating an example of a method for performing adaptive load balancing across multiple network interfaces of a bridged system.

FIG. 3 is a flow diagram illustrating an example of a method for performing adaptive load balancing across multiple network interfaces of a bridged system. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 300 is performed by network manager 170a of host OS 110. In one example, the method 300 is performed by network manager 170b of hypervisor 160. Examples are discussed in the context of network manager 170a of host OS 110 for the purpose of consistency. However, such examples are applicable to both physical computer systems and virtualized computer systems.

Method 300 begins at block 302 when network manager 170a receives an outbound packet from a network interface. In an example, network manager 170a receives an outbound packet from a virtual network interface (e.g. virtual network interface 1 148a). In one example, network manager 170a may receive the outbound packet from a physical network interface.

The term "packet" generally refers to a network packet, which is a formatted data unit transferred over a packet-switched network (e.g., IP packets). In an example, network manager 170a receives an outbound packet from a network interface associated with a source computing system of the outbound packet. In one example, network manager 170a receives the outbound packet from a network interface that forwards the outbound packet on behalf of a different source computing system.

At block 304, network manager 170a selects an intermediate network interface to use for sending the outbound packet. In an example, network manager 170a selects an intermediate network interface (e.g., network interface 1 130) from multiple, available intermediate network interfaces (e.g., network interface one 130, network interface 2 132 . . . network interface N 134) to use for sending an outbound packet.

In an example, network manager 170a monitors usage of each available intermediate network interface (e.g., network interface one 130, network interface to 132 . . . network interface N 134) and adaptively selects an available intermediate network interface to use for sending an outbound packet received from a virtual network interface. For example, network manager 170a may select an intermediate network interface to use based on past, current, or anticipated future utilization of one or more available intermediate network interfaces. In one example, network manager 170a adaptively sends network traffic across a set of intermediate network interfaces to distribute the network traffic across the intermediate network interfaces as evenly as possible.

At block 306, network manager 170a examines a mapping between the network interface and the intermediate network interface to determine a layer-2 network address assigned to the mapping. In an example, network manager 170a examines a mapping between a virtual network interface (e.g., virtual network interface 1 148a) and an intermediate network interface (e.g., network interface 1 130) selected at block 304. For example, network manager 170a may locate and reference a mapping record associating the virtual network interface and the intermediate network interface in network interface mappings 180a. In one example, network manager 170a examines the mapping to determine a virtualized MAC address assigned to the mapping.

At block 308, network manager 170a updates the outbound packet to replace a source layer-2 network address with the layer-2 network address assigned to the mapping. In an example, network manager 170a replaces the source MAC address of the outbound packet received from the virtual network interface with the virtualized MAC address assigned to the mapping between the virtual network interface and the selected intermediate network interface. In one example, the source MAC address of the outbound packet is the MAC address of the network interface. In one example, each additional outbound packet received from the virtual network interface that is to be distributed via the intermediate network interface also is updated with the same virtualized MAC address assigned to the mapping.

At block 310, network manager 170a sends the updated outbound packet using the intermediate network interface. In an example, network manager 170a forwards the updated outbound packet to the selected intermediate network interface, which then sends the updated outbound packet over a network.

At block 312, network manager 170a selects a second intermediate network interface to use for sending a second outbound packet received from the network interface. In an example, network manager 170a receives a second outbound packet from a virtual network interface (e.g., virtual network interface 1 148a) of a virtual machine (e.g., VM 1 140a). In one example, network manager 170 receives the second outbound packet from a different virtual network interface (e.g., virtual network interface 1 148b) than the virtual network interface that sent the first packet at block 302.

In an example, network manager 170a selects the second intermediate network interface (e.g., network interface 2 132) from multiple, available intermediate network interfaces (e.g., network interface 1 130, network interface 2 132 . . . network interface N 134) to use for sending the second outbound packet. In one example, network manager 170a adaptively selects a different intermediate network interface based on utilization of one or more of the intermediate network interfaces to distribute and balance network traffic processing.

At block 314, network manager 170a examines a second mapping between the network interface and the second intermediate network interface to determine a layer-2 network address assigned to the second mapping. In an example, network manager 170a examines a second mapping between a virtual network interface (e.g., virtual network interface 1 148a) and the second intermediate network interface selected at block 312. In one example, network manager 170a locates the second mapping by searching network interface mappings 180a and examines the second mapping to determine a virtualized MAC address that has been assigned to the second mapping.

At block 316, network manager 170a updates the second outbound packet to replace a source network address with the layer-2 network address assigned to the second mapping. In an example, network manager 170a replaces the source MAC address of the second outbound packet with the virtualized MAC address assigned to the second mapping determined at block 314. In one example, additional outbound packets received from the same virtual network interface that also are to be distributed via the second intermediate network interface also are updated with the virtualized MAC address assigned to the second mapping.

At block 318, network manager 170a sends the updated second outbound packet using the second intermediate network interface. In an example, network manager 170a forwards the updated second outbound packet to the second intermediate network interface, which then transmits the updated second outbound packet over a network.

Figure 4:
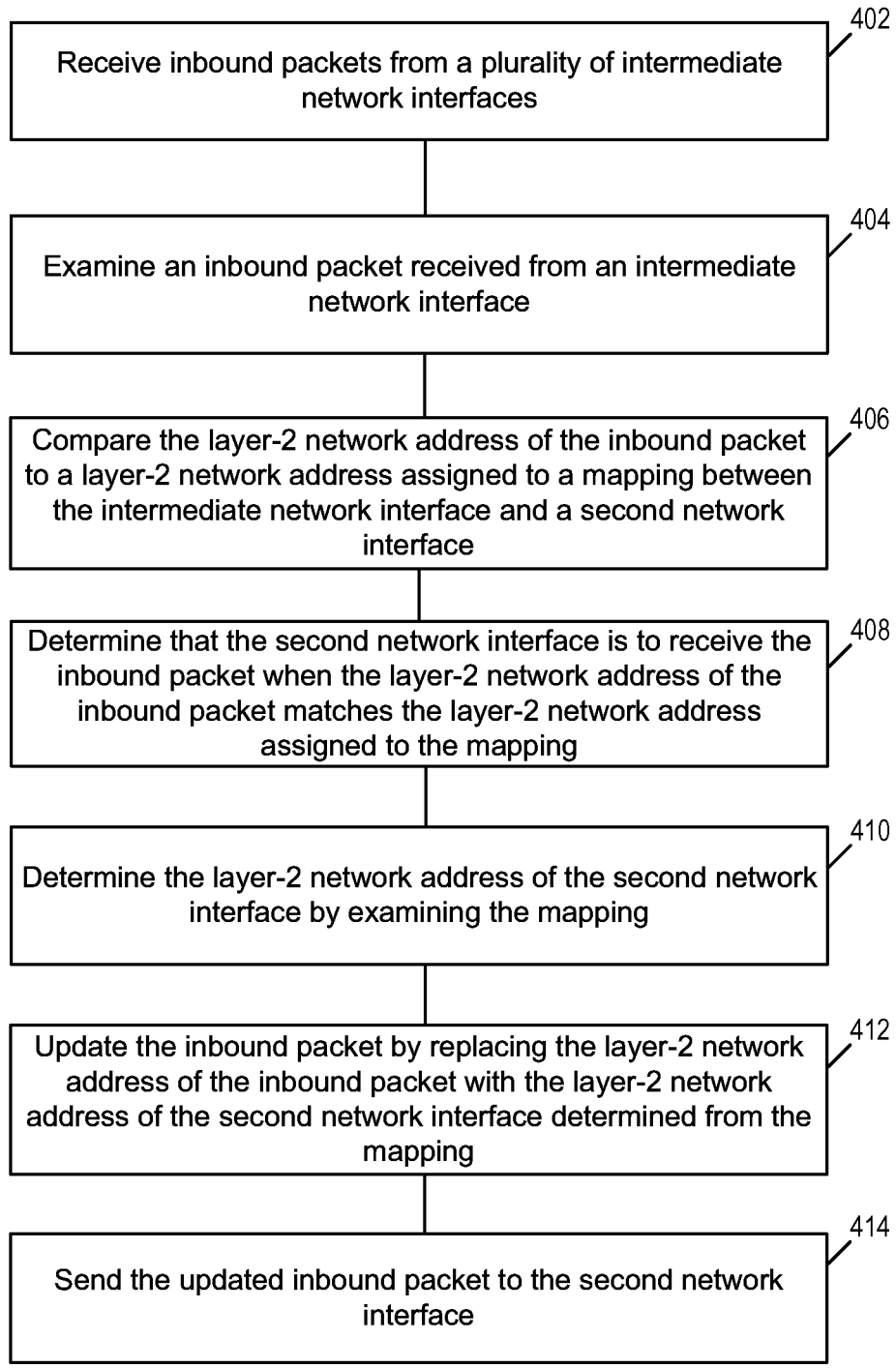
FIG. 4 is a flow diagram illustrating an example of a method of performing adaptive load balancing for inbound packets in a bridged system.

FIG. 4 is a flow diagram illustrating an example of a method of performing adaptive load balancing for inbound packets in a bridged system. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 400 is performed by network manager 170a of host OS 110. In one example, the method 400 is performed by network manager 170b of hypervisor 160. Examples are discussed in the context of network manager 170a of host OS 110 for the purpose of consistency. However, such examples are applicable to both physical computer systems and virtualized computer systems.

Method 400 begins at block 402 when network manager 170a receives inbound packets from a plurality of intermediate network interfaces. In an example, network manager 170a receives inbound packets from various intermediate network interfaces (e.g. network interface 1 130, network interface 2 132 . . . network interface N 134). In an example, the various intermediate network interfaces are aggregated into a single logical network interface using a network bonding driver.

At block 404, network manager 170a examines an inbound packet received from an intermediate network interface. In an example, network manager 170a examines an inbound packet received from one the intermediate network interfaces (e.g. network interface 1 130, network interface 2 132 . . . network interface N 134) to determine a destination layer-2 network address of the inbound packet. Network manager 170a also may examine the inbound packet to determine other associated information and various aspects of the inbound packet.

At block 406, network manager 170a compares the layer-2 network address of the inbound packet to a layer-2 network address assigned to a mapping between the intermediate network interface and a second network interface. In an example, network manager 170a compares a destination MAC address of the inbound packet to a virtualized MAC address assigned to a mapping between an intermediate network interface (e.g., network interface 1 130) and another network interface (e.g., virtual network interface 1 148a). In one example, network manager 170a locates the mapping between the intermediate network interface and the second interface by searching network interface mappings (e.g., network interface mappings 180a, 180b). For example, network manager 170a may search virtualized MAC addresses assigned to network interface mappings 180a, 180b to identify a mapping with a destination MAC address for the inbound packet.

In an example, a mapping between the intermediate network interface and the second interface also may be stored local to an intermediate network interface. For example, the mapping may be stored in a collection of one or more mappings recorded on a computer readable storage medium coupled to the intermediate network interface (e.g., network interface 1 130). In one example, a mapping local to the intermediate network interface is provided to network manager 170a for processing.

At block 408, network manager 170a determines that the second network interface is to receive the inbound packet when the layer-2 network address of the inbound packet matches the layer-2 network address assigned to the mapping. In an example, network manager 170a determines that a network interface (e.g., virtual network interface 1 148a) is to receive the inbound packet when the MAC address of the inbound packet matches the virtualized MAC address assigned to a mapping between the network interface (e.g., virtual network interface 1 148a) and the intermediate network interface (e.g., network interface 1 130). In one example, network manager 170a forwards an original outbound to the selected intermediate network interface for distribution without updating the outbound packet, for example based on an IP address, when a corresponding network interface mapping is not locatable.

At block 410, network manager 170a determines the layer-2 network address of the second network interface by examining the mapping. In an example, network manager 170a examines an identified mapping between an intermediate network interface (e.g., network interface 1 130) and a second network interface (e.g., virtual network interface 1 148a) to determine an identity of the second network interface. For example, network manager 170a may examine a network interface mapping identified at block 408 to determine the MAC address of the network interface that is to receive the inbound packet from the intermediate network interface.

At block 412, network manager 170a updates the inbound packet by replacing the layer-2 network address of the inbound packet with the layer-2 network address of the second network interface determine from the mapping. In an example, network manager 170A updates the inbound packet to replace a destination MAC address of the inbound packet with the MAC address of the second network interface determined at block 410. In an example, network manager 170a replaces the destination MAC address (e.g., a distinct virtualized MAC address assigned to a mapping between network interfaces) with the MAC address of the network interface that is to receive the inbound packet. In an example, additional inbound packets received from the same intermediate network interface for the second network interface similarly are updated with the MAC address of the second network interface.

At block 414, network manager 170a sends the updated inbound packet to the second network interface. In an example, network manager 170a forwards the updated inbound packet to the second network interface (e.g., virtual network interface 1 148a).

Figure 5:
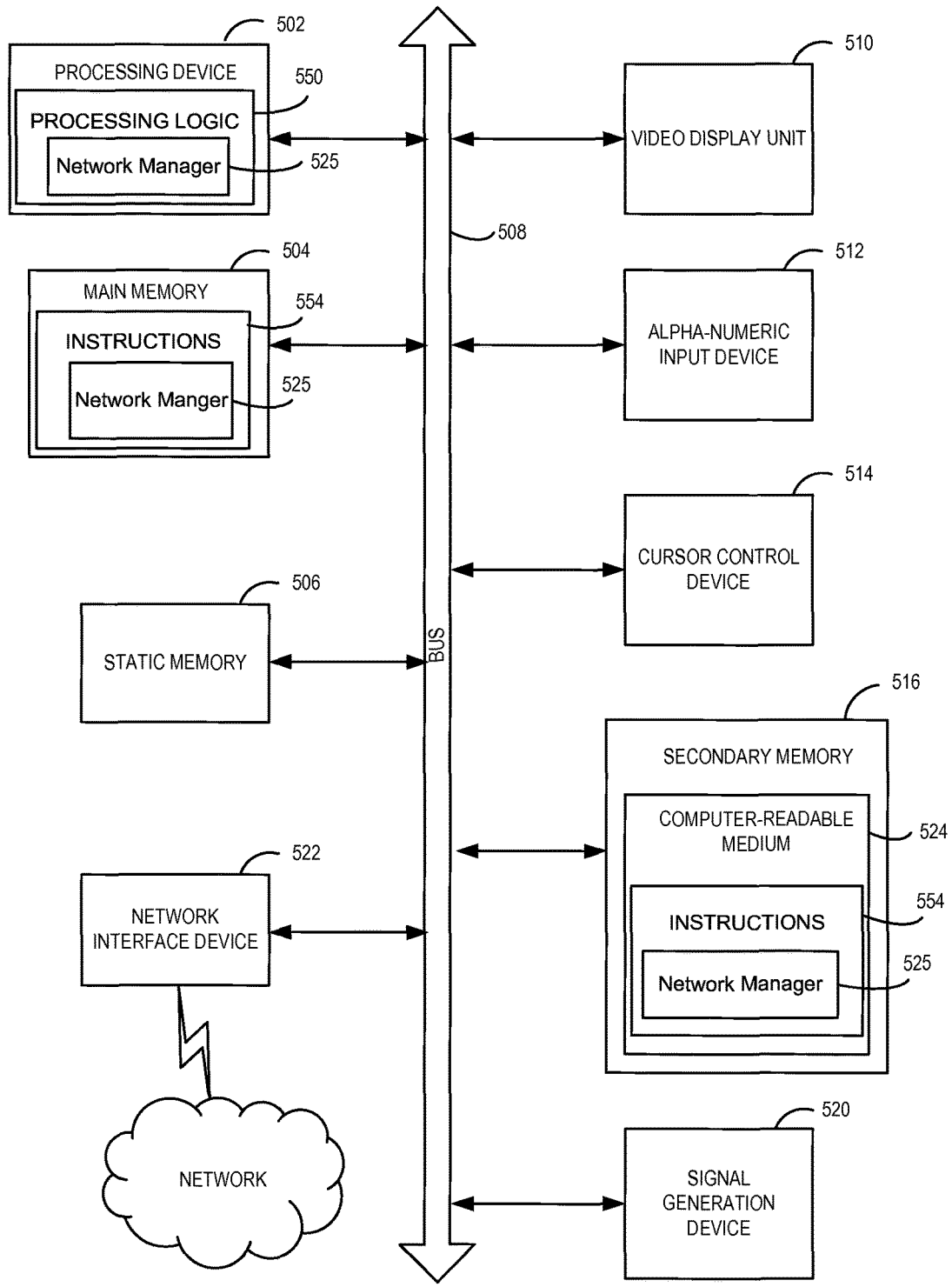
FIG. 5 illustrates a diagrammatic representation of a machine in the example form of a computer system.

FIG. 5 illustrates a diagrammatic representation of a machine in the example form of a computer system 500 within which a set of instructions, for causing the machine to perform any one or more of the methodologies discussed herein, may be executed. The computer system 500 may correspond, for example, to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., network manager 525). The instructions 554 may also reside, completely or at least partially, within the main memory 504 and/or within the processing device 502 during execution thereof by the computer system 500 (the main memory 504 and the processing device 502 constituting machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 may additionally include a network manager module (not shown) for implementing the functionalities of a network manager 525 (e.g. network manager 170a, network manager 170b). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "processing", "executing", "modifying", "creating", "detecting," "copying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
    generating, by a processor device, a first unique virtualized layer-2 network address for a first unique combination of a virtual network interface and a first physical network interface;
    generating, by the processor device, a second unique virtualized layer-2 network address for a second unique combination of the virtual network interface and a second physical network interface;
    assigning, by the processor device, the first unique virtualized layer-2 network address to a first mapping associating the virtual network interface with the first physical network interface;
    assigning, by the processor device, the second unique virtualized layer-2 network address to a second mapping associating the virtual network interface with the second physical network interface;
    receiving, by the processor device, an outbound packet associated with the virtual network interface;
    selecting, by the processor device, one of the first physical network interface or the second physical network interface for the outbound packet;
    replacing, by the processor device, a source layer-2 network address of the outbound packet with the first unique virtualized layer-2 network address in view of the first mapping when selecting the first physical network interface to send the outbound packet for the virtual network interface or replacing the source layer-2 network address of the outbound packet with the second virtualized layer-2 network address in view of the second mapping when selecting the second physical network interface to send the outbound packet; and
    sending, by the processor device, the outbound packet with the first unique virtualized layer-2 network address via the first physical network interface or sending the outbound packet with the second unique virtualized layer-2 network address via the second physical network interface.

2. The computer-implemented method of claim 1, wherein the first unique virtualized layer-2 network address is assigned to the first mapping prior to receiving the outbound packet.

3. The computer-implemented method of claim 2, wherein the second unique virtualized layer-2 network address is assigned to the second mapping prior to receiving the outbound packet.

4. The computer-implemented method of claim 1, further comprising:
    analyzing, by the processor device, a respective stored mapping between the virtual network interface and one of the physical network interfaces in view of the selecting.

5. The computer-implemented method of claim 1, wherein the selecting is performed in view of utilization of one or more of the first physical network interface and the second physical network interface.

6. The computer-implemented method of claim 1, further comprising:
    generating, by the processor device, a third unique virtualized layer-2 network address for a third unique combination of the virtual network interface and a third physical network interface;
    storing, by the processor device, a third mapping to associate the virtual network interface with the third physical network interface; and
    assigning, by the processor device, the third unique virtualized layer-2 network address to the third mapping associating the virtual network interface with the third physical network interface.

7. The computer-implemented method of claim 6, further comprising:
    selecting, by the processor device, the third physical network interface to send a second outbound packet associated with the virtual network interface;
    replacing, by the processor device, a source layer-2 network address of the second outbound packet with the third unique virtualized layer-2 network address in view of the third mapping; and
    sending, by the processor device, the updated second outbound packet with the third unique virtualized layer-2 network address using the third physical network interface.

8. The computer-implemented method of claim 1, wherein the first physical network interface and the second physical network interface are aggregated as a single logical network interface.

9. The computer-implemented method of claim 6, wherein the first physical network interface, the second physical network interface, and the third physical network interface are aggregated as a single logical network interface.

10. The computer-implemented method of claim 1, wherein the first physical network interface and the second physical network interface are aggregated using a network bonding driver.

11. The computer-implemented method of claim 1, wherein the selecting is performed, at least in part, in view of predicted utilization of at least one of the first physical network interface and the second physical network interface.

12. The computer-implemented method of claim 1, wherein the first mapping comprises an identifier of the virtual network interface, an identifier of the first physical network interface, and the first unique virtualized layer-2 network address.

13. The computer-implemented method of claim 1, wherein the selecting is performed in view of a network aggregation mode associated with the first physical network interface and the second physical network interface.

14. A computer system, comprising:
a memory; and
a processor device coupled to the memory to perform operations comprising:
generating a first unique virtualized layer-2 network address for a first unique combination of a virtual network interface and a first physical network interface;
generating a second unique virtualized layer-2 network address for a second unique combination of the virtual network interface and a second physical network interface;
assigning the first unique virtualized layer-2 network address to a first mapping associating the virtual network interface with a first physical network interface;
assigning the second unique virtualized layer-2 network address to a second mapping associating the virtual network interface with the second physical network interface;
receiving an outbound packet associated with the virtual network interface;
selecting one of the first physical network interface or the second physical network interface to send the outbound packet;
replacing a source layer-2 network address of the outbound packet with the first unique virtualized layer-2 network address of the stored first mapping when selecting the first physical network interface to send the outbound packet or replacing the source layer-2 network address of the outbound packet with the second virtualized layer-2 network address in view of the second mapping when selecting the second physical network interface to send the outbound packet; and
sending the outbound packet with the first unique virtualized layer-2 network address via the first physical network interface or sending the outbound packet with the second unique virtualized layer-2 network address via the second physical network interface.

15. The computer system of claim 14, wherein the operations further comprise:
analyzing a respective one of the mappings between the virtual network interface and one of the physical network interfaces in view of the selecting.

16. The computer system of claim 14, wherein the operations further comprise:
generating a third unique virtualized layer-2 network address for a third unique combination of the virtual network interface and a third physical network interface;
assigning the third unique virtualized layer-2 network address to a third mapping associating the virtual network interface with the third physical network interface.

17. The computer system of claim 14, wherein the first physical network interface and the second physical network interface are aggregated as a single logical network interface.

18. The computer system of claim 17, wherein the single logical network interface comprising the first physical network interface and the second physical network interface is associated with virtual network interface.

19. The computer system of claim 14, wherein the selecting is performed in view of utilization of one or more of the first physical network interface and the second physical network interface.

20. A non-transitory computer-readable medium having instructions recorded thereon, that when executed by a processor device, cause the processor device to perform operations, comprising:
generating a first unique virtualized layer-2 network address for a first unique combination of a virtual network interface and a first physical network interface;
generating a second unique virtualized layer-2 network address for a second unique combination of the virtual network interface and a second physical network interface;
assigning the first unique virtualized layer-2 network address to a first mapping associating the virtual network interface with the first physical network interface;
assigning the first unique virtualized layer-2 network address to the second mapping associating the virtual network interface with the second physical network interface;
selecting, by the processor device, one of the physical network interface or the second physical network interface to send an outbound packet received from the virtual network interface;
replacing a source layer-2 network address of the outbound packet with the first unique virtualized layer-2 network address in view of the first mapping when selecting the first physical network interface or replacing the source layer-2 network address of the outbound packet with the second unique virtualized layer-2 network address in view of the second mapping when selecting the second physical network interface; and
sending the outbound packet with the first unique virtualized layer-2 network address via the first physical network interface in view of the selecting and in view of the replacing or sending the outbound packet with the second unique virtualized layer-2 network address via the second physical network interface in view of the selecting and in view of the replacing.

* * * * *